(12) United States Patent
Sekimoto et al.

(10) Patent No.: US 8,599,425 B2
(45) Date of Patent: Dec. 3, 2013

(54) IMAGE PROCESSING APPARATUS

(75) Inventors: Tomomi Sekimoto, Tokyo (JP); Keisuke Nakazono, Hino (JP); Akira Ueno, Hachioji (JP)

(73) Assignee: Olympus Corporation, Tokyo (JP)

( * ) Notice: Subject to any disclaimer, the term of this patent is extended or adjusted under 35 U.S.C. 154(b) by 682 days.

(21) Appl. No.: 12/821,570

(22) Filed: Jun. 23, 2010

(65) Prior Publication Data

US 2010/0328724 A1 Dec. 30, 2010

(30) Foreign Application Priority Data

Jun. 24, 2009 (JP) ................................. 2009-150003
Jun. 16, 2010 (JP) ................................. 2010-137744

(51) Int. Cl.
*G06K 15/00* (2006.01)
*H04N 1/32* (2006.01)

(52) U.S. Cl.
USPC ......................................... 358/1.16; 358/468

(58) Field of Classification Search
USPC ................. 358/1.16, 404, 444, 468; 712/248; 375/239
See application file for complete search history.

(56) References Cited

U.S. PATENT DOCUMENTS

| | | | | |
|---|---|---|---|---|
| 7,683,972 B2* | 3/2010 | Tanigawa | ...................... | 348/536 |
| 7,900,021 B2 | 3/2011 | Nakazono et al. | | |
| 2003/0156520 A1* | 8/2003 | Han | ............................ | 369/59.11 |
| 2005/0270853 A1* | 12/2005 | Chiang et al. | ............. | 365/189.05 |
| 2006/0187349 A1* | 8/2006 | Tanigawa | ....................... | 348/500 |
| 2007/0025636 A1 | 2/2007 | Furukawa et al. | | |
| 2007/0173692 A1* | 7/2007 | Homan et al. | ................. | 600/118 |
| 2007/0285716 A1* | 12/2007 | Ohmiya | ......................... | 358/1.16 |
| 2008/0112218 A1* | 5/2008 | Katagiri | ........................ | 365/163 |
| 2009/0193234 A1 | 7/2009 | Ors et al. | | |
| 2010/0225625 A1* | 9/2010 | Morita | ........................... | 345/205 |

FOREIGN PATENT DOCUMENTS

| | | |
|---|---|---|
| JP | 2000-312327 A | 11/2000 |
| JP | 2005-44098 A | 2/2005 |
| JP | 2005-78608 A | 3/2005 |

OTHER PUBLICATIONS

Related U.S. Appl. No. 12/821,503; First Named Inventor: Tomonori Yonemoto; Title: "Imaging Processing Apparatus"; filed Jun. 23, 2010.

\* cited by examiner

*Primary Examiner* — Jerome Grant, II
(74) *Attorney, Agent, or Firm* — Holtz, Holtz, Goodman & Chick, PC

(57) ABSTRACT

An image processing apparatus includes a processing block, a first control block, and a second control block. The first control block issues a write request signal for inputting a first write pulse to a register of the processing block. The second control block issues a second write pulse cliffs differing from the first write pulse with timing independent of the first control block. The processing block includes the register, a write pulse generating circuit which generates the first write pulse according to the write request signal from the first control block, and a switching circuit which selects either the first write pulse or the second write pulse and inputs the selected pulse to the register.

4 Claims, 5 Drawing Sheets

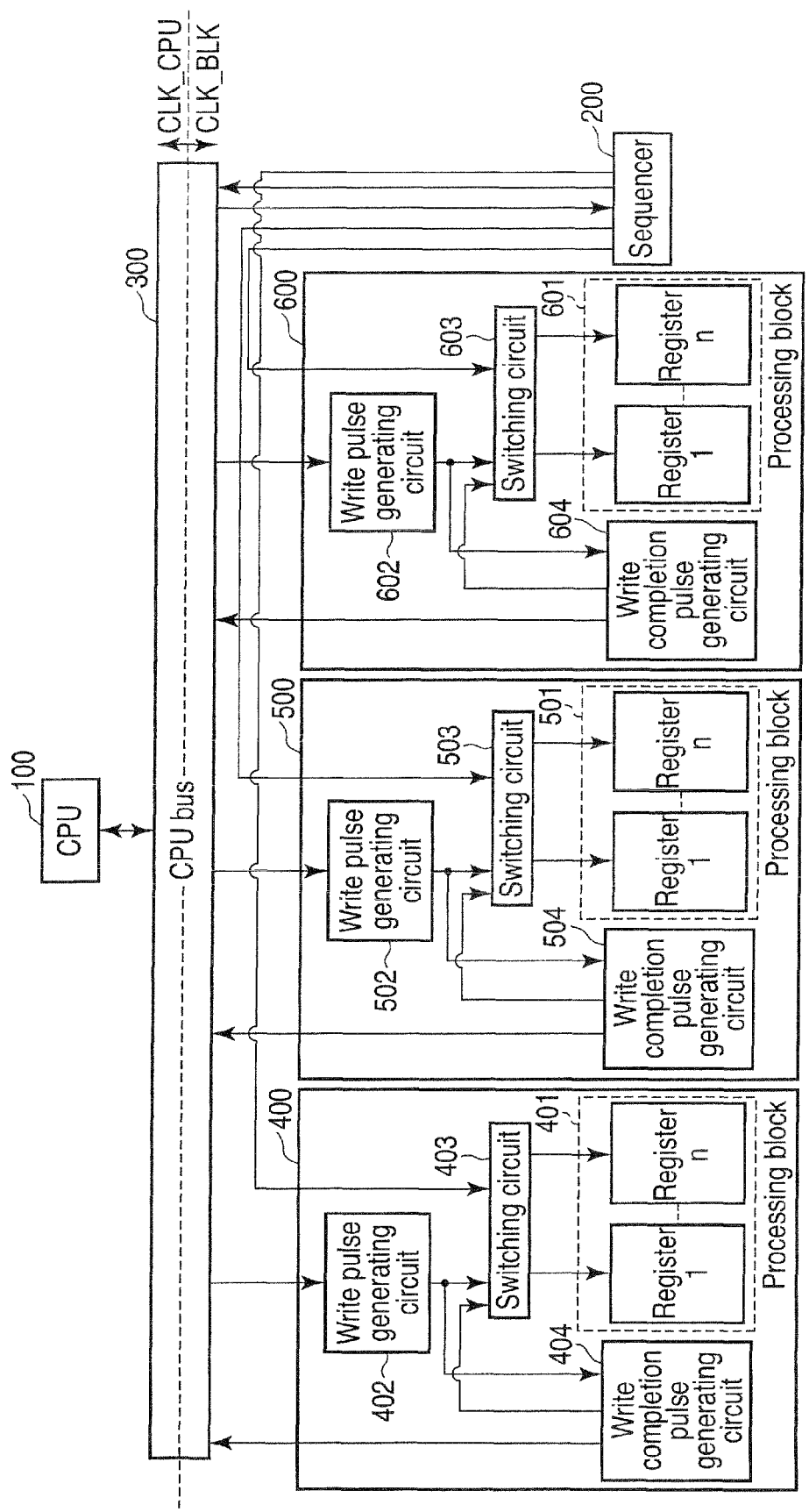
F I G. 1

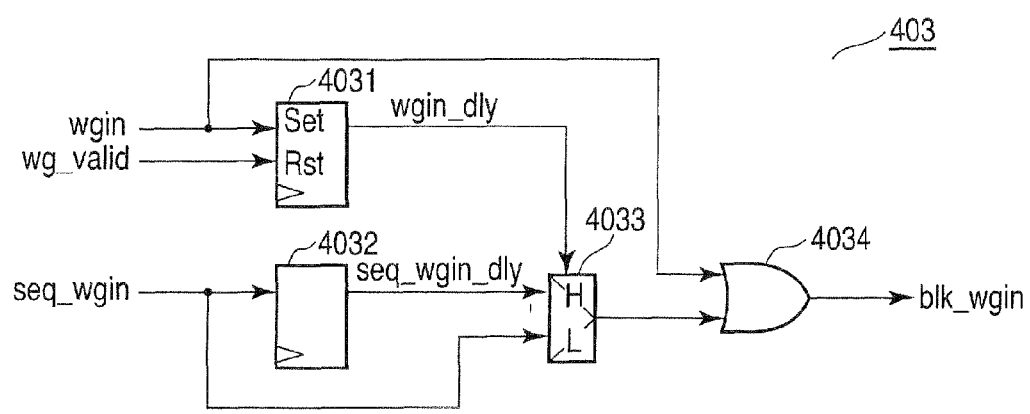
F I G. 2

IMAGE PROCESSING APPARATUS

CROSS-REFERENCE TO RELATED APPLICATIONS

This application is based upon and claims the benefit of priority from prior Japanese Patent Applications No. 2009-150003, filed Jun. 24, 2009; and No. 2010-137744, filed Jun. 16, 2010, the entire contents of both of which are incorporated herein by reference.

BACKGROUND OF THE INVENTION

1. Field of the Invention

This invention relates to the technique for increasing the processing speed of an image processing apparatus.

2. Description of the Related Art

Jpn. Pat. Appln. KOKAI Publication No. 2005-78608 has disclosed the technique for alleviating the load on the CPU acting as a control block that controls an image processing apparatus capable of processing image data in blocks. In Jpn. Pat. Appln. KOKAI Publication No. 2005-78608, a sequencer block capable of accessing a processing block without the intervention of a bus is used as a control block differing from the CPU. The sequencer block controls the processing of image data which was performed in blocks by the CPU.

A protocol for data transfer used in a conventional image processing apparatus as disclosed in Jpn. Pat. Appln. KOKAI Publication No. 2005-78608 will be explained. As an example, a protocol used when the CPU writes data to the register of a processing block will be explained.

The CPU issues not only a register address, a signal representing the address of the register of a processing block to be accessed, but also a chip select signal for selecting a processing block where the register is to be written to, a register write signal for requesting register write, and a write data signal representing data to be written. When having received a chip select signal and a register write signal from the CPU, the processing block recognizes that the CPU is to perform register write, generates a write pulse, and writes the write data signal as setting data to the register according to the write pulse. The setting data is a different signal from the write pulse. The setting data of each of the CPU and sequencer is input to the processing block. The setting data to be actually written to the register of the processing block is determined, depending on which write pulse is used. After the register has been written to, the processing block generates a write completion pulse and issues a completion notice signal to the CPU in synchronization with the write completion pulse. In response the issue of the completion notice signal, the CPU recognizes the completion of the register write. As a result, a series of processes related to register write is completed.

The series of processes is an example of register write according to a protocol called a handshake protocol. In the case of register write according to such a handshake protocol, the CPU cannot perform next register write during a period from when it issues a register signal until it receives a completion notice signal. Accordingly, a register access period viewed from the CPU is a period from when the CPU issues a chip select signal until it receives a completion notice signal.

In addition to the handshake protocol, there is a fixed weight protocol which needs the issue of a specific number of cycles of chip select signals and register write signals. In this case, too, the CPU cannot perform next register write during a certain period of time.

The above example is based on the assumption that the CPU and processing block both belong to the same clock domain (or both have the same clock frequency). In the recent image processing apparatuses, the CPU and processing block both hardly belong to the same clock domain. In such a case, a process called clock transfer must be carried out during the series of processes to synchronize the CPU and processing block with each other. To realize such clock transfer, a process according to a handshake protocol has to be carried out.

A protocol for data transfer when clock transfer is needed will be explained with reference to FIG. 5. As described above, the CPU issues not only a register address ADD but also a chip select signal CS_X, a register write signal WE_X, and a write data signal (not shown). These signals are all in synchronization with operation clock CL_CPU of the CPU.

Having received the chip select signal CS_X and register write signal WE_X from the CPU, the processing block generates a write pulse cpu_wgin synchronizing with the operation clock CLK_CPU of the CPU. The processing block generates a write pulse wgin synchronizing with operation clock CLK_BLK of the processing block from the write pulse cpu_wgin and writes write data to the register according to the write pulse wgin. After the register write has been completed, the processing block generates a write completion pulse wg_valid synchronizing with the operation clock CLK_BLK and further generates a write completion pulse cpu_valid synchronizing with the operation clock CLK_CPU of the CPU from the write completion pulse cpu_valid. Then, the processing block issues a completion notice signal WAIT in synchronization with the write completion pulse cpu_valid. As a result, the CPU completes the register write. With such a series of processes, even when the clock domain of the CPU differs from that of the processing block, register write can be performed, while the CPU and processing block are synchronizing with each other properly.

During the series of processes, too, the CPU cannot perform next register write during the period from when it issues a register write signal until it receives a completion notice signal. Accordingly, even in the case of FIG. 5, the register access period viewed from the CPU is the period from when the CPU issues a chip select signal CS_X until it receives a completion notice signal WAIT.

BRIEF SUMMARY OF THE INVENTION

According to an embodiment of the invention, there is provided an image processing apparatus comprising: a processing block which includes a register to which setting data is written according to an input write pulse and which carries out a specific process based on the setting data written in the register; a first control block which issues a write request signal for inputting a first write pulse to the register; a second control block which issues a second write pulse differing from the first write pulse with timing independent of the first control block, wherein the control block includes a write pulse generating circuit which generates the first write pulse according to the write request signal from the first control block, and a switching circuit which selects either the first write pulse or the second write pulse and inputs the selected pulse to the register.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a configuration of an image processing apparatus according to an embodiment of the invention;

FIG. 2 is a diagram showing a configuration of a switching circuit according to the embodiment;

DETAILED DESCRIPTION OF THE INVENTION

Figure 3:
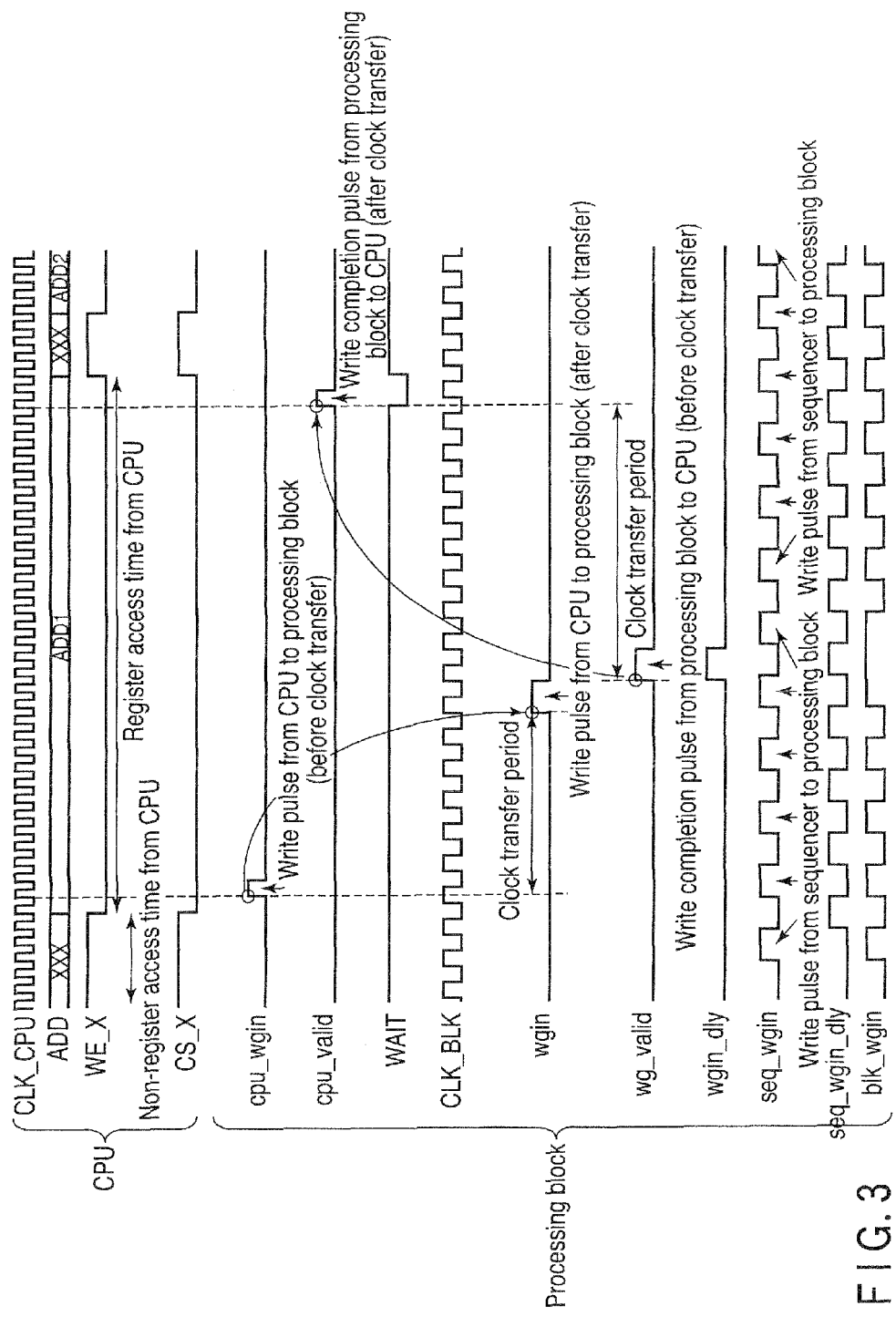
FIG. 3 is a timing chart showing the process of performing register write at the image processing apparatus according to the embodiment.

Hereinafter, referring to the accompanying drawings, an embodiment of the invention will be explained.

FIG. 1 is a diagram showing a configuration of an image processing apparatus according to an embodiment of the invention. The image processing apparatus of FIG. 1 comprises a CPU 100, a sequencer 200, a CPU bus 300, and processing blocks 400, 500, 600.

The CPU 100 functioning as a first control block, which is connected to the CPU bus 300, controls the operations of the sequencer 200 and processing blocks 400, 500, 600 in synchronization with clock CLK_CPU. The CPU 100 not only inputs a start trigger to the sequencer 200 via the CPU bus 300 to start the operation of the sequencer 200 but also sets setting data, including operating conditions for the processing blocks 400, 500, 600.

The sequencer 200 functioning as a second control clock, which is connected to the CPU bus 300, starts to operate in response to the start trigger from the CPU 100 and controls the operations of the processing blocks 400, 500, 600 independently of the CPU 100. The sequencer 200 issues a second write pulse seq_wgin to the processing blocks 400, 500, 600. The second write pulse seq_wgin is used to set setting data, including operating conditions for the processing blocks 400, 500, 600.

In the embodiment, the clock domain of the sequencer 200 differs from that of the CPU 100. That is, the sequencer 200 of the embodiment operates in synchronization with clock CLK_BLK whose frequency differs from that of the CPU 100. In addition, the CPU 100 controls the processing blocks 400, 500, 600 via the CPU bus 300, whereas the sequencer 200 controls the processing blocks 400, 500, 600 without the intervention of the CPU bus 300.

The CPU bus 300 is a data transfer path for enabling data transfer between the CPU 100, sequencer 200, and processing blocks 400, 500, 600.

Each of the processing blocks 400, 500, 600 carries out a specific process according to setting data set by the CPU 100 or sequencer 200. In the embodiment, the clock domain of the processing blocks 400, 500, 600 is the same as that of the sequencer 200. Each of the processing blocks 400, 500, 600 in the embodiment operates in synchronization with clock CLK_BLK. The specific process performed by each of the processing blocks 400, 500, 600 is not restrictive. Each of the processing blocks 400, 500, 600 may carry out a different process or the same process.

The processing block 400 of FIG. 1 includes a register 401, a write pulse generating circuit 402, a switching circuit 403, and a write completion pulse generating circuit 404. Similarly, the processing block 500 includes a register 501, a write pulse generating circuit 502, and a switching circuit 503, and a write completion pulse generating circuit 504. The processing block 600 includes a register 601, a write pulse generating circuit 602, and a switching circuit 603, and a write completion pulse generating circuit 604.

In each of the processing blocks 400, 500, 600 of FIG. 1, a circuit part which carries out the specific process is not shown. The circuit part which carries out the specific process is provided suitably according to the contents of each of the processing blocks. As shown in FIG. 1, the processing blocks 400, 500, 600 have the same configuration, except for the configuration of the part excluding the circuit part which carries out the specific process. Accordingly, hereinafter, the configuration of the processing block 400 will be explained.

The CPU 100 or sequencer 200 writes setting data necessary for the specific process at the processing block 400 to the register 401. The register 401, which includes n registers 1, ..., n, is written setting data according to write pulse blk_wgin input from the switching circuit 403 in synchronization with clock CLK_BLK. The setting data is a signal different from a write pulse. The setting data of both the CPU and sequencer are input to the processing block. Setting data to be actually written to the register of the processing block is determined, depending on which write pulse is used. In the example of FIG. 1, the register 401, 501, 601 are connected separately to the sequencer 200. The sequencer 200 writes setting data to each of the registers 401, 501, 601 separately. If the registers 401, 501, 601 are connected to the sequencer 200 via a common signal line, the setting data can be written to the registers 401, 501, 601 simultaneously by the sequencer 200.

The write pulse generating circuit 402 generates a first write pulse according to a register write request signal issued from the CPU 100. The register write request signal issued from the CPU 100 includes a chip select signal CS_X and a register write signal WE_X. The chip select signal CS_X is a signal for selecting a processing block where register write is to be performed. The register write signal WE_X is a signal for requesting register write.

Each of the chip select signal CS_X and register write signal WE_X is a signal synchronizing with clock CLK_CPU. Write pulses generated according to these signals are also in synchronization with clock CLK_CPU. In contrast, the register 401 carries out a write operation in synchronization with clock CLK_BLK differing from clock CLK_CPU. Accordingly, the write pulse generating circuit 402 generates a write pulse cpu_wgin synchronizing with clock CLK_CPU from the chip select signal CS_X and register write signal WE_X. In addition, the write pulse generating circuit 402 generates a write pulse wgin synchronizing with clock CLK_BLK from a write pulse cpu_wgin and inputs the write pulse wgin as a first write pulse to the switching circuit 403. Such clock transfer enables the register write to be performed even if the clock domain of the CPU 10 differs from that of the processing block 400. Since the sequencer 200 operates in synchronization with clock CLK_ELK, the write pulse generating circuit 402 needs no clock transfer.

The switching circuit 403 selects either a first write pulse wgin generated based on the chip select signal CS_X and register write signal WE_X from the CPU 100 or a second write pulse seq_wgin input from the sequencer 200, generates a third write pulse blk_wgin based on the selected write pulse, and writes the setting data to a register to be presently written to in the register 401. If only either the first write pulse wgin or the second write pulse seq_wgin is input, the switching circuit 403 of the embodiment writes setting data corresponding to the selected write pulse to a register to be presently written to in the register 401 according to the third write pulse blk_wgin based on the input write pulse. If the first write pulse wgin and second write pulse seq_wgin are both input simultaneously, the switching circuit 403 generates a third write pulse blk_wgin based on the first write pulse wgin and writes the setting data from the CPU 100 to a register to be presently written to in the register 401. Then, the switching circuit 403 generates a third pulse blk_wgin based on the second write pulse seq_wgin and writes the setting data from the sequencer 200 to a register to be presently written to in the register 401.

FIG. 2 is a diagram showing a configuration of the switching circuit 403. The switching circuit 403 of FIG. 2 includes flip-flops (FF) 4031, 4032, a selector 4033, and a logical add circuit 4034.

The FF 4031 has a set terminal Set and a reset terminal Rst. A first write pulse wgin generated at the write pulse generating circuit 402 is input to the set terminal Set. A write completion pulse wg_valid (explained in detail later) generated at the write completion pulse generating circuit 404 is input to the reset terminal Rst. The FF 4031 not only takes in the first write pulse wgin in synchronization with clock CLK_BLK but also outputs the first write pulse wgin held until then as a signal wgin_dly. That is, the signal wgin_dly is a signal one clock later than the first write pulse wain. In addition, when the write completion pulse wg_valid is input, the FF 4031 resets the value held until then. The FF 4032 riot only takes in the second write pulse seq_wgin in synchronization with clock CLK_BLk but also outputs the second write pulse seq_wgin held until then as a signal seq_wgin_dly. That is, the signal seq_wgin_dly is a signal one clock later than the second write pulse seq_wgin.

The FF 4032 not only takes in the second write pulse seq_wgin in synchronization with clock CLK_BLk but also outputs the second write pulse seq_wgin held until then as a signal seq_wgin_dly. That is, the signal seq_wgin_dly is a signal one clock later than the second write pulse seq_wgin.

The second write pulse seq_wgin and signal seq_wgin_dly are input to the selector 4033, which then outputs one of them according to the value of signal wgin_dly. The selector 4033 outputs the second write pulse seq_wgin when the signal wgin_dly is low, that is, when the first write pulse wgin is not input, and outputs the signal seq_wgin_dly when the signal wgin_dly is high.

The logical add circuit 4034 outputs a third write pulse blk_wgin when either the first write pulse wgin or the output of the selector 4033 is input.

The write completion pulse generating circuit 404 receives the first write pulse wgin, generates a write completion pulse, and issues a completion notice signal based on the write completion pulse. The completion notice signal is a signal for the CPU 100 to recognize the completion of register write.

The first write pulse wgin is a signal synchronizing with clock CLK_BLK. A write completion pulse generated according to the first write pulse wgin also synchronizes with clock CLK_BLK. Accordingly, to cause the completion notice signal to synchronize with clock CLK_CPU, the write completion pulse generating circuit 404 generates a write completion pulse wg_valid synchronizing with clock CLK_BLK from the first write pulse wgin and further generates a write completion pulse cpu_valid synchronizing with clock CLK_CPU from the write completion pulse wg_valid. Then, the write completion pulse generating circuit 404 generates a completion notice signal WAIT synchronizing with clock CLK_CPU from the write completion pulse cpu_valid and issues the completion notice signal WAIT to the CPU 100.

The operation of the image processing apparatus of FIG. 1 will be explained with reference to FIG. 3. FIG. 3 shows a case where a handshake protocol is used as a protocol used when the CPU 100 performs register write.

As shown in FIG. 3, the sequencer 200 of the embodiment, issues a second write pulse seq_wgin to write data to the registers of the processing blocks 400, 500, 600 with arbitrary timing independently of the operation of the CPU 100. For example, when the registers of the processing blocks 400, 500, 600 are written to in that order, the second write pulse seq_wgin from the sequencer 200 is first input to the switching circuit 403 of the processing block 400. At this time, the switching circuit 403 generates a third write pulse blk_wgin based on the second write pulse seq_wgin. According to the third write pulse blk_wgin, setting data from the sequencer 200 is written to the register to be presently written to of the register 401. After the setting data has been written to the register 401 according to the third write pulse blk_wgin, the second write pulse seq_wgin from the sequencer 200 is input to the switching circuit 503 of the processing block 500. After the setting data has been written to the register 501 according to the third write pulse blk_wgin, the second write pulse seq_wgin from the sequencer 200 is input to the switching circuit 603 of the processing block 600.

When the CPU 100 writes data to the register of any one of the processing blocks (e.g., processing block 600), it issues a register address ADD representing the address of a register to be written to in the register 601. Thereafter, a chip select signal CS_X indicating that processing block 600 is to be selected, a register write signal WE_X, and a write data signal indicating data to be written are issued to the processing blocks 400, 500, 600. The write pulse generating circuits 402, 502, 602 of the processing blocks 400, 500, 600, respectively, each generates a write pulse cpu_wgin based on the chip select signal CS_X and register write signal WE_X and further generates a first write pulse wgin from the write pulse cpu_wgin. At this time, the first write pulse wgin and second write pulse seq_wgin might be input to the switching circuits 403, 503, 603. In this case, a third write pulse blk_wgin is generated based on the first write pulse wgin. According to the third write pulse blk_wgin, the setting data from the CPU 100 is written to a register in the register 601 to be presently written to by the CPU 100. Then, one clock after the third write pulse blk_wgin has been generated based on the first write pulse wgin, a third write pulse blk_wgin is generated based on the second write pulse seq_wgin. According to the third write pulse blk_wgin, the setting data from the sequencer 200 is written to the register in a processing block to be presently written to by the sequencer 200. In this way, the competition between the CPU 100 and sequencer 200 in register write is prevented.

After the third write pulse blk_wgin has been written to the register 601 based on the first write pulse wgin, a write completion pulse wg_valid is generated at the write completion pulse generating circuit 604. On the basis of the write completion pulse wg_valid, a write completion pulse cpu_valid is generated. Then, the write completion pulse generating circuit 604 issues a completion notice signal WAIT based on the write completion pulse cpu_valid. The completion notice signal WAIT is input to the CPU 100. As a result, the CPU 100 recognizes the completion of the register write.

By performing register write according to the protocol as shown in FIG. 3, the sequencer 200 can perform register write except the period from when a first write pulse wgin with which the CPU 100 actually performs register write is generated until a write completion pulse wg_valid is generated. That is, in the embodiment, the processing time of the sequencer 200 can be shortened by enabling the sequencer 200 to perform register write during a clock transfer period when a first write pulse wgin is generated from a write pulse cpu_wgin and during a clock transfer period when a write completion pulse cpu_valid is generated from a write completion pulse wg_valid. In addition, by enabling the sequencer 200 to perform register write even in a clock transfer period, register write by the CPU 100 might compete with register write by the sequencer 200. However, in the embodiment, if a write pulse from the CPU 100 might compete with a write pulse from the sequencer 200, the switching circuit can make a write pulse from the sequencer 200 valid immediately after (one clock after) the CPU 100 performed register write. Consequently, the processing time of the sequencer will not increase significantly.

Figure 4A:
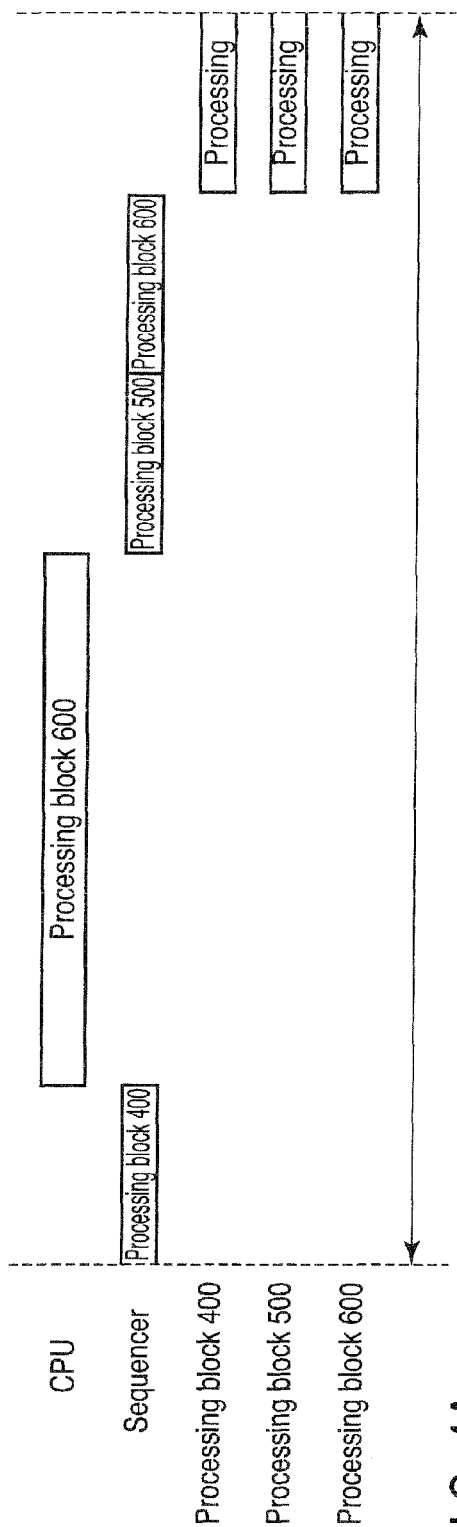
FIG. 4A is a timing chart showing the process of causing a plurality of processing blocks to operate in a conventional equivalent.
Figure 4B:
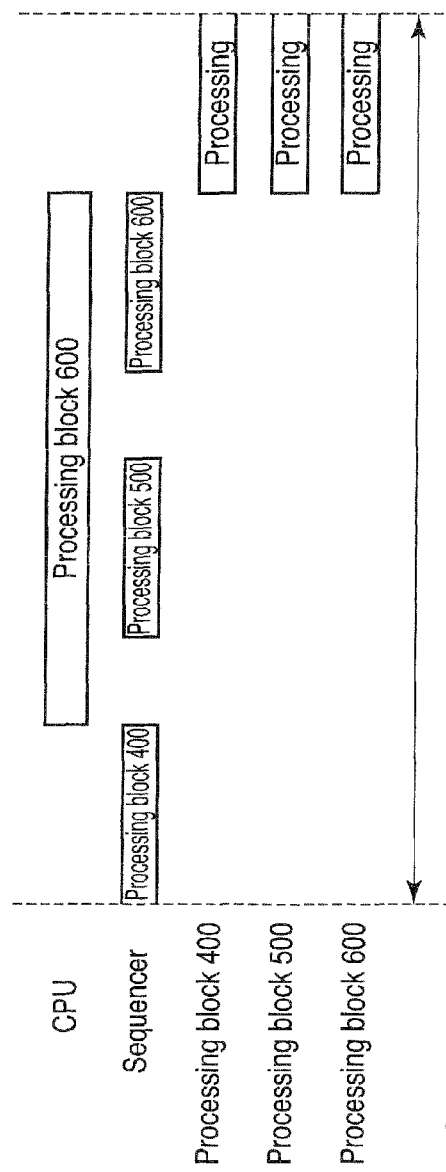
FIG. 4B is a timing chart showing the process of causing a plurality of processing blocks to operate in the embodiment.
Figure 5:
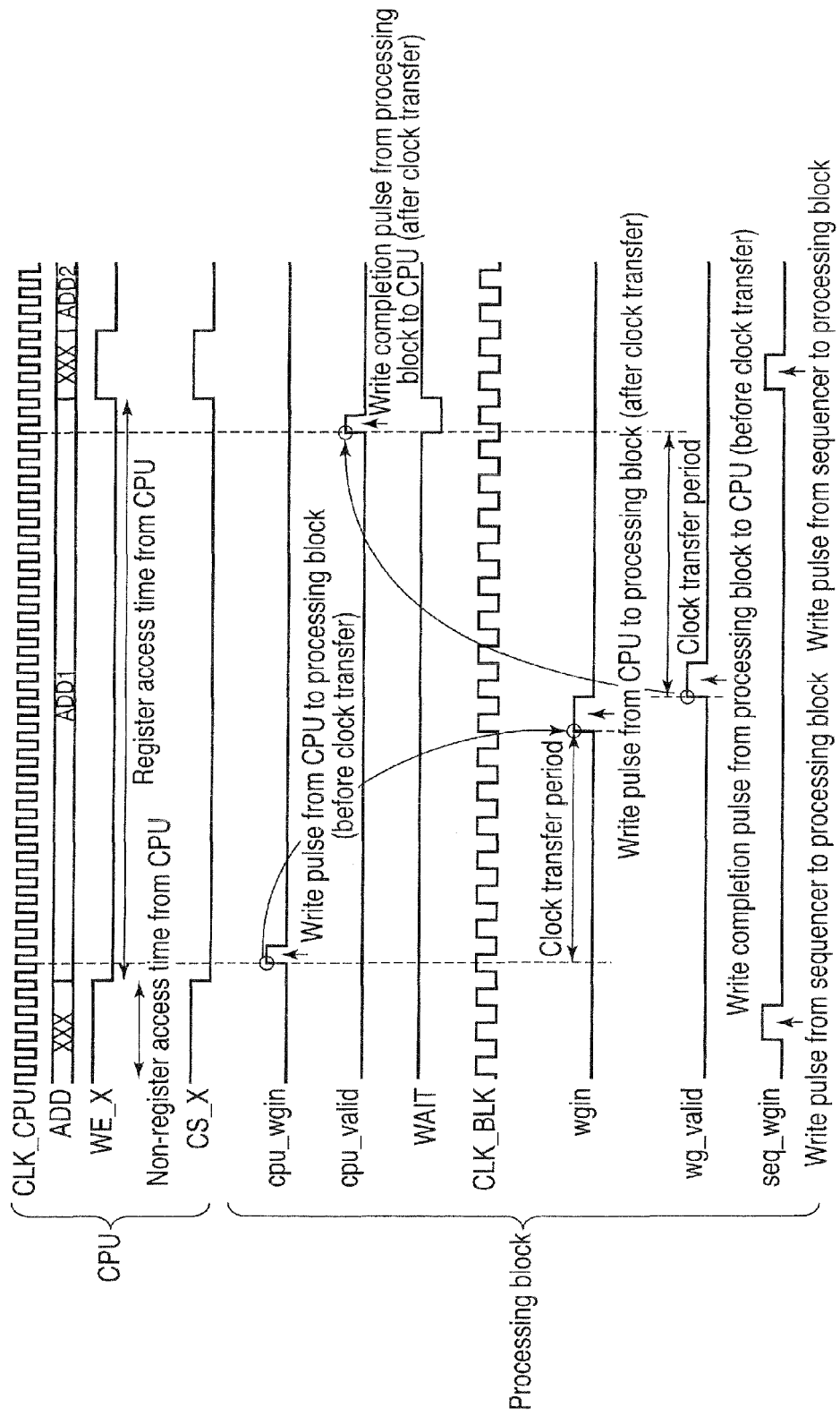
FIG. 5 is a timing chart showing the process of performing register write in a conventional image processing apparatus.

FIGS. 4A and 4B show the comparison between the processing performed by conventional techniques and the processing performed by the embodiment. For example, in the conventional techniques, when the CPU 100 is writing data to the register of the processing block 600 continuously, the sequencer 200 cannot write data to the registers of the processing blocks 500, 600 until the CPU 100 has finished writing data to the register of the processing block 600 (or until a completion notice signal WAIT for the last write register has been issued) as shown in FIG. 4A.

In contrast, in the embodiment, even when the CPU 100 is writing data to the register of the processing block 600 continuously, the sequencer 200 can write data to the registers of the processing blocks 500, 600, except when a write pulse wgin for the CPU 100 to write data to the processing block is generated.

In the embodiment, the clock domain of the CPU 100 has differed from that of the processing blocks 400, 500, 600. However, they may belong to the same clock domain. Moreover, in the embodiment, the protocol for the CPU 100 to perform register write has been a handshake protocol. However, the embodiment may be applied to a fixed weight protocol which enables the CPU 100 to perform register write at specific fixed intervals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a processing block which includes a register to which setting data is written according to an input write pulse and which carries out a specific process based on the setting data written in the register;
   a first control block which issues a write request signal for inputting a first write pulse to the register; and
   a second control block which issues a second write pulse differing from the first write pulse with timing independent of the first control block,
   wherein the processing block includes:
      a write pulse generating circuit which generates the first write pulse according to the write request signal from the first control block, and
      a switching circuit which selects either the first write pulse or the second write pulse and inputs the selected pulse to the register.

2. The image processing apparatus according to claim 1, wherein:
   when only one of the first write pulse and the second write pulse is input to the processing block, the switching circuit selects said input one of the first write pulse and the second write pulse and inputs the selected pulse to the register, and
   when both the first write pulse and the second write pulse are input to the processing block at a same time, the switching circuit selects the first write pulse and inputs the first write pulse to the register.

3. An image processing apparatus comprising:
   a processing block which includes a register to which setting data is written according to an input write pulse and which carries out a specific process based on the setting data written in the register;
   a first control block which issues a write request signal for inputting a first write pulse to the register; and
   a second control block which issues a second write pulse differing from the first write pulse with timing independent of the first control block,
   wherein the processing block includes:
      a write pulse generating circuit which generates the first write pulse according to the write request signal from the first control block, and
      a switching circuit which selects either the first write pulse or the second write pulse and inputs the selected pulse to the register, and
   wherein the second control block belongs to a clock domain different from a clock domain of the first control block and the same as a clock domain of the processing block.

4. An image processing apparatus comprising:
   a processing block which includes a register to which setting data is written according to an input write pulse and which carries out a specific process based on the setting data written in the register;
   a first control block which issues a write request signal for inputting a first write pulse to the register; and
   a second control block which issues a second write pulse differing from the first write pulse with timing independent of the first control block,
   wherein the processing block includes:
      a write pulse generating circuit which generates the first write pulse according to the write request signal from the first control block, and
      a switching circuit which selects either the first write pulse or the second write pulse and inputs the selected pulse to the register, and
   wherein the processing block, the first control block, and the second control block are connected to a common bus, the first control block issues the write request signal to the processing block via the bus, and the second control block issues the second write pulse to the processing block without intervention of the bus.

* * * * *